Oct. 3, 1950 J. H. GREANY 2,524,256
OPPOSED-CONTACTS DISTANCE GAUGE
Filed March 7, 1946 2 Sheets-Sheet 1
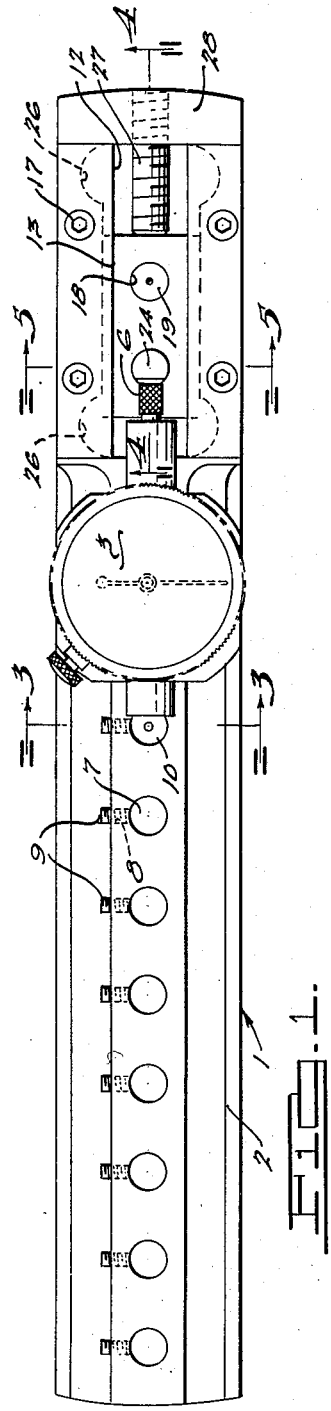
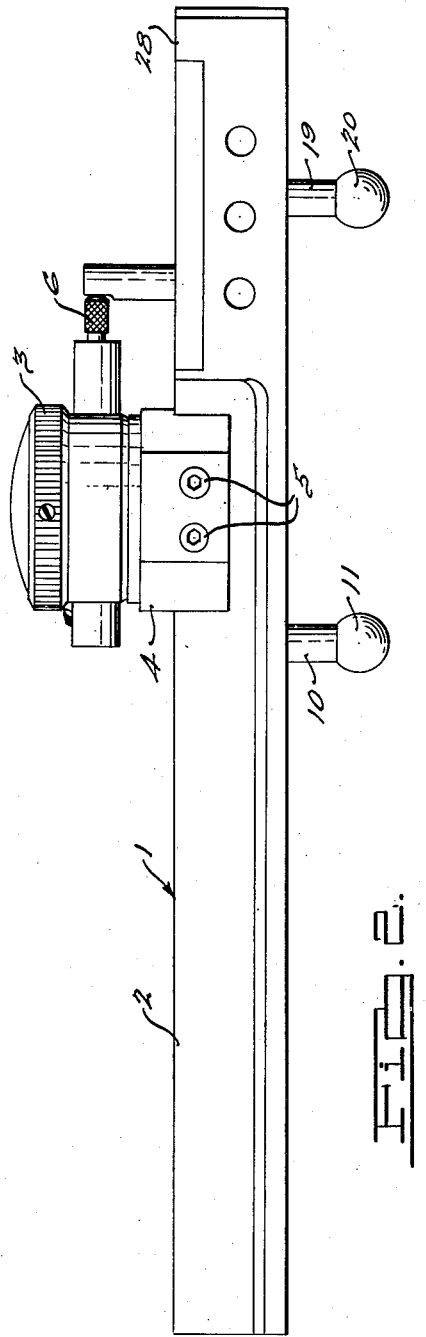
INVENTOR.
John H. Greany.
BY
Harness, Dickey & Pierce.
ATTORNEYS.

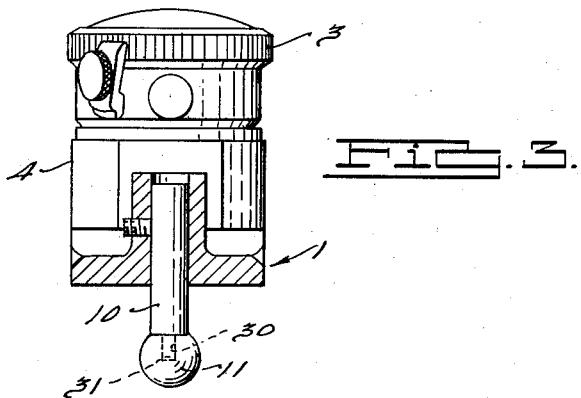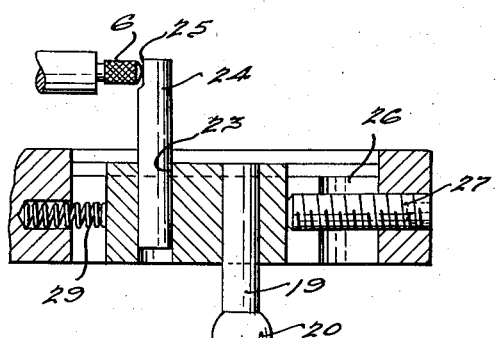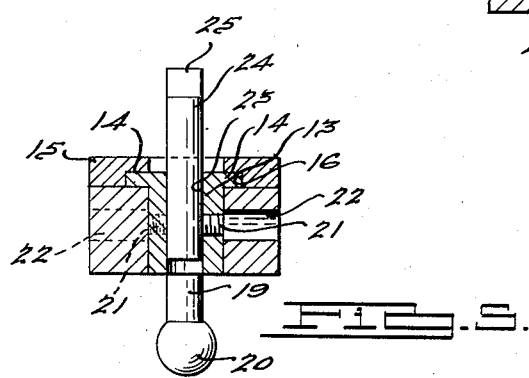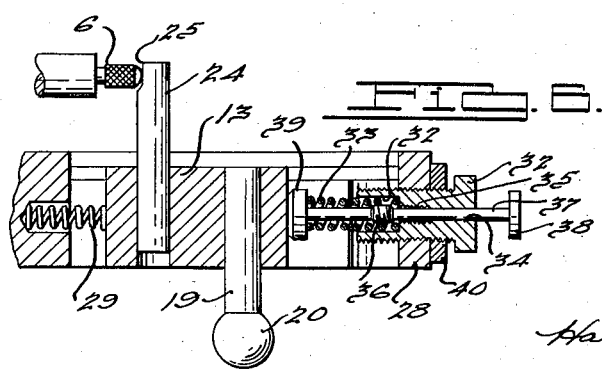

Patented Oct. 3, 1950

2,524,256

UNITED STATES PATENT OFFICE 2,524,256

OPPOSED-CONTACTS DISTANCE GAUGE

John H. Greany, Detroit, Mich., assignor to Langlois Gauge Company, Inc., Detroit, Mich., a corporation of Michigan Application March 7, 1946, Serial No. 652,709

1 Claim. (Cl. 33—147)

This invention relates to gauging tools, and particularly to a gauging tool for accurately gauging the internal and external diameters of objects having cylindrical, tapered, arcuate and like surfaces.

Difficulty has always been experienced in accurately measuring the diameter of tapered, arcuate, as well as cylindrical surfaces, either internal or external, at a predetermined distance from an end face thereof.

The tool of the present invention is constructed to overcome this difficulty by accurately gauging a diameter at any set depth whether or not the surface is of true cylindrical, conical, arcuate or any varying form. The diameter at any particular depth may be checked on the work to ascertain whether this diameter is that shown on a drawing from which the work is being constructed.

The device embodies a bar having along the longitudinal dimension thereof spaced aligned apertures for receiving one of a pair of ball stems at various spacings, each conforming to the degree of deflection of an indicating device plunger. A slide is mounted in the opposite end of the bar in which a second ball stem is secured to project below the bottom of the bar in alignment with the first ball stem. An upwardly projecting finger is provided on the top of the slide, disposed in engagement with the operating plunger of the indicating device. A spring actuates the slide toward the forward end of the bar and the plunger on the indicating device is actuated by a spring into engagement with the upwardly projecting finger on the slide. When the slide is disposed at the forward end, its position may be accurately set by a screw so that the spacing of the remote surfaces of the balls on the end of the stem may be accurately set between Johansson blocks and the dial of the indicating device may be set to zero reading.

The extension of the balls on the stems from the bottom surface of the bar is adjusted for the depth that the reading is to be taken on the exterior or the interior surface of the workpiece. The balls are then placed in engagement with the surface and the bar is moved downwardly until its bottom face engages the top face of the workpiece from which the measurement is to be made. The movement of the balls toward or away from each other as they follow the surface causes the slide to adjust itself longitudinally of the bar and actuates the plunger of the indicating device so that when depth has been reached an accurate reading may be had of the dimension between the points of the surface contacted by the balls.

When an interior surface is to be measured, the spring biases the slide toward the end of the bar away from the indicating device. When an exterior surface is to be measured, the spring biases the slide toward the indicating device so that the slide will be moved away from the device when the exterior surface contacts the ball portion of the stem. The instrument may be so constructed as to have springs of different strength at each end. The second spring of greater strength may be withdrawn out of engagement with the slide to permit the first spring to function or it may be left in engagement therewith so as to overcome the strength of the first spring. In this manner the slide may be provided with a bias to move it toward or away from the indicating device at the will of the operator and thereby be employed for measuring either internal or external surfaces.

Accordingly, the main objects of the invention are: to provide a gauging tool for accurately measuring the diameter of an internal or external surface at a predetermined distance from the end thereof; to provide a gauging tool having a pair of gauging balls one of which is mounted on a slide to be adjustable toward or away from the other ball, both of which are adjustably spaced from the face of the supporting bar so that measurements of diameters may be made on external and internal surfaces of a workpiece at a predetermined distance from one end thereof; to form a gauging tool from a bar having an indicating device thereon provided with a plunger movable a predetermined distance and a plurality of apertures for a ball stem which are spaced apart a like distance which is less than the movement of the plunger and having a slide thereon for supporting a second ball stem in spaced relation to the first ball stem, the balls of the stems being movable by a surface being gauged toward or away from each other to measure a diameter of a surface at a predetermined distance from the face of the bar preselected by the adjustment of the balls therefrom, and in general, to provide a gauging tool for accurately measuring the diameter of internal and external surfaces at a predetermined depth from a face thereof which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a plan view of a gauging tool embodying features of this invention;

Fig. 2 is a view in side elevation of the gauging tool illustrated in Fig. 1;

Fig. 3 is a sectional view of the structure illustrated in Fig. 1, taken on the line 3—3 thereof;

Fig. 4 is a broken sectional view of the structure illustrated in Fig. 1, taken on the line 4—4 thereof;

Fig. 5 is a sectional view of the structure illustrated in Fig. 1, taken on the line 5—5 thereof, and Fig. 6 is a view of structure, similar to that illustrated in Fig. 4, showing a modified form thereof.

The gauging tool of the present invention comprises a bar 1 having a central upwardly directed boss 2 disposed along the rearward portion thereof on which an indicating device 3 of standard form is secured by a clamping block 4 by a plurality of Allen screws 5. The gauge has an operating arm 6 which is movable axially across its diameter a predetermined distance depending upon the unit of measurement of the gauge. A plurality of apertures 7 are spaced an equal distance apart vertically through the boss 2 having threaded apertures 8 communicating therewith in which Allen screws 9 are disposed for clamping a stem 10 having a ball 11 secured to its end. The spacing of the apertures 7 is less than the distance the arm 6 moves, which substantially equals the unit of measurement of the indicating device. This permits the stem 10 to be shifted from one to another of the apertures 7, depending upon the diameter to be measured, while any fractional amount of the distance between adjacent apertures will be indicated on the indicating device.

The forward end of the bar 1 contains a slot 12 for receiving a slide 13 having laterally extending flanges 14 at the top for supporting the slide therewithin. A pair of plates 15, containing shoulders 16, is secured by Allen screws 17 to the bar for encompassing the flanges 14 of the slide and retaining it against upward movement from the slot 12. The slide is provided with an aperture 18 in which a stem 19 projects, on the end of which a ball 20 is supported. The stem is secured within the aperture 18 by a setscrew 21 which is adjusted through one of a plurality of apertures 22 which extend through one wall of the bar 1 forming the slot.

An aperture 23 is also provided through the slide 13 having a pin or finger 24 secured therein to extend upwardly therefrom by a setscrew 21 adjusted through apertures 22 through the other wall of the slot 12. A flat surface 25 is provided on the upper end of the pin, facing the end of the arm 6 with which the end engages. The inner face of the wall of the slot is cut away at each end at 26 to reduce the frictional engagement of the wall with the slide and to provide an area in which any dust and grime which collects on the slide may work into as the slide is moved backward and forward on its support.

A stop for the slide is formed by a threaded screw 27 adjustable in the end wall 28 of the bar 1 for limiting the movement of the slide 13 forwardly so that the approximate spacing of the balls may be provided thereby. A spring 29 is recessed in the bar 1 and into one end of the slide for biasing the slide against the stop screw 27. Balls 11 and 20 are preferably separate elements made of hard wear-resisting material and having a threaded aperture 30 which is threaded upon a stud 31 on the ends of the stems 10 and 19.

In operation, when a measurement is to be taken, the stem 10 is placed within the aperture 7 so that the distance between the balls plus the ball diameters is slightly greater than the diameter to be measured. The stems 10 and 19 are adjusted axially to have the center line of the balls disposed a predetermined accurate distance from the bottom face of the bar 1. The setscrew 27 is adjusted to set the slide when the spacing of the remote points of the balls is a known amount, after which the indicating device is set at zero reading. When the bar is moved downwardly toward the aperture to be measured with the balls engaging the internal surface thereof, the slide will be moved toward the indicating device until the bottom face of the bar rests upon the face of the workpiece from the depth of which the reading is to be taken. This depth has been set through the adjustment of the stems 10 and 19 to have the centers of the balls coincide therewith.

When the bottom face of the bar rests upon the surface of the workpiece, the reading of the indicating device will provide the amount to be subtracted from the known amount employed to set the device, as pointed out above. Irrespective of whether the internal surface is cylindrical, tapered, arcuate or of any form, the measurement of the diameter at a predetermined depth will always be obtained when using the gauging tool. When the tool is to be employed for measuring the exterior diameter, the spring 29 should then be placed on the right side of the slide instead of the left, as illustrated in Fig. 4.

In Fig. 6, a construction is illustrated wherein the gauging tool may be employed for measuring either inside or outside diameters. This is made possible by providing a threaded sleeve 32 in the end wall 28 of the bar 1 having a recess therein for receiving one end of a spring 33. The spring 33 is stronger than spring 29, being capable of urging the slide to the left while overcoming the tension of the spring 29. The spring 33 should be approximately twice the strength of the spring 29 so that it will urge the slide to the left with the same force that the spring 29 will urge the slide to the right when the spring 33 is withdrawn from contact with the slide.

The sleeve 32 is provided with a central aperture 34 having a threaded portion 35 for receiving a threaded portion 36 on a stem 37 which extends through the aperture 34. The stem is rotated by means of a head 38 to screw the thread 36 into or out of the thread 35 in the sleeve 32. The opposite end of the stem 37 from that having the head 38 is provided with a body 39 against the adjacent surface of which the forward end of the spring 33 engages. The body 39 contacts the right-hand end of the slide 13 and urges the slide to the left when the thread 36 is disengaged from the thread 35, overcoming the bias of the spring 29 so that the instrument may be employed for gauging outside diameters. When the tool is to be employed for gauging inside diameters, the stem 37 is pulled to the right to move the threads 36 into engagement with the thread 35 and the head 38 is thereafter rotated to screw the thread 36 into the thread 35 and to retain the spring 33 retracted and the body 39 out of engagement with the slide 13. The slide thereafter will be urged to the right against the body 39 by the tension of the spring 29 so that the tool may then be employed for gauging diameters of internal surfaces. The body 39 functions as a stop screw 27 and is adjustable through the rotation of the sleeve 32 in the end wall 28 of the bar 1 and is locked in position by the lock nut 40 disposed on the thread of the sleeve. The stem 37 is locked on the sleeve when the threaded portion 36 has been screwed against the end of the threaded section 35 within the sleeve. With this arrangement, the tool is capable of gauging both internal and external diameters.

When an external diameter is to be gauged, the balls are set a predetermined distance apart, slightly less than the diameter to be measured, with the slide biased to the left by the spring 33. The stems 10 and 19 are adjusted to have the centers of the balls 11 and 20 disposed a predetermined distance from the bottom face of the bar 1 so that when the balls are moved downwardly over the outside surface to be measured, they will move away from each other until the face of the bar rests upon the top surface of the workpiece, at which time the diameter is accurately gauged. The distance between the balls is measured before the work is gauged and the indicator is then set at zero reading. The distance the indicator has moved when depth is reached is added to the distance the balls are spaced to obtain the diameter measured. Thus, it will be seen that the gauging tool can be employed for accurately gauging an external and internal diameter at any point in depth from one end thereof.

What is claimed is:

A gauging tool including, in combination, a bar, a ball supported on said bar, a slide on said bar, a ball on said slide, an indicating device on said bar, means on said slide for actuating said indicating device, a spring for urging said slide away from said indicating device, a second spring of greater strength for urging said slide toward said indicating device when overcoming the tension of said first spring, and means for compressing said second spring and moving it out of engagement with said slide to permit said first spring to bias said slide with the full force of said first spring.

JOHN H. GREANY.

REFERENCES CITED

The following references are of record in the file of this patent:

UNITED STATES PATENTS

| Number | Name | Date |
|---|---|---|
| 1,157,389 | Hess | Oct. 19, 1915 |
| 1,225,315 | Conrad | May 8, 1917 |
| 1,786,325 | Young | Dec. 23, 1930 |
| 1,854,244 | Allison et al. | Apr. 19, 1932 |
| 1,911,442 | Earl | May 30, 1933 |
| 2,087,896 | Blomstrom | July 27, 1937 |
| 2,392,617 | Sisson | Jan. 8, 1946 |
| 2,427,924 | Rose | Sept. 23, 1947 |